United States Patent
Olariu et al.

(10) Patent No.: US 7,133,361 B2
(45) Date of Patent: Nov. 7, 2006

(54) METHOD AND SYSTEM FOR IMPROVEMENT OF NETWORK PERFORMANCE OVER ASYMMETIC LINKS

(75) Inventors: Gabriel Olariu, Gaithersburg, MD (US); Douglas Dillon, Gaithersburg, MD (US); Frank Kelly, Walkersville, MD (US)

(73) Assignee: Hughes Network Systems, Inc., Germantown, MD (US)

( * ) Notice: Subject to any disclaimer, the term of this patent is extended or adjusted under 35 U.S.C. 154(b) by 928 days.

(21) Appl. No.: 09/963,225

(22) Filed: Sep. 26, 2001

(65) Prior Publication Data
US 2003/0128711 A1    Jul. 10, 2003

(51) Int. Cl.
*H04L 12/28* (2006.01)
(52) U.S. Cl. .................. 370/230; 370/401; 370/417; 370/466
(58) Field of Classification Search .......... 370/230, 370/236, 316, 389, 401, 412, 413, 414, 415, 370/416, 417, 418, 466, 467; 714/798, 799
See application file for complete search history.

(56) References Cited

U.S. PATENT DOCUMENTS

| | | | |
|---|---|---|---|
| 6,697,996 B1 * | 2/2004 | Chethik | 714/804 |
| 6,820,132 B1 * | 11/2004 | Puente et al. | 709/238 |
| 6,904,286 B1 * | 6/2005 | Dantu | 455/452.2 |
| 2001/0055313 A1 * | 12/2001 | Yin et al. | 370/466 |
| 2002/0057295 A1 * | 5/2002 | Panasyuk et al. | 345/804 |

\* cited by examiner

*Primary Examiner*—Seema S. Rao
*Assistant Examiner*—Shick Hom
(74) *Attorney, Agent, or Firm*—Craig Plastrik

(57) ABSTRACT

A communications system includes a plurality of communications channels for transporting packets. The system also includes a gateway that is coupled to the communications channels. The gateway is configured to buffer a packet that is received over one of the communications channel from a first host in a queue and to determine a window value for maximizing transmission rate based upon occupancy of the queue. The gateway is configured to a second host according to a prescribed protocol to force use of the determined window value in the second host over another one of the communications channels. The present invention has particular applicability to an asymmetric bandwidth network, such as a two-way satellite system.

42 Claims, 4 Drawing Sheets

METHOD AND SYSTEM FOR IMPROVEMENT OF NETWORK PERFORMANCE OVER ASYMETIC LINKS

FIELD OF THE INVENTION

The present invention relates to a data communications system, and is more particularly related to a proxy architecture for improving network performance.

BACKGROUND OF THE INVENTION

The entrenchment of data networking into the routines of modern society, as evidenced by the prevalence of the Internet, particularly the World Wide Web, has placed ever-growing demands on service providers to continually improve network performance. To meet this challenge, service providers have invested heavily in upgrading their networks to increase system capacity (i.e., bandwidth). In many circumstances, such upgrades may not be feasible economically or the physical constraints of the communication system do not permit simply "upgrading." Accordingly, service providers have also invested in developing techniques to optimize the performance of their networks. Because much of today's networks are either operating with or are required to interface with the Transmission Control Protocol/Internet Protocol (TCP/IP) suite, attention has been focused on optimizing TCP/IP based networking operations.

TCP was designed to be very flexible and to operate over a wide variety of communication networks, including both slow and fast links, high latency links, and links with low and high error rates. However, while TCP (and other high layer protocols) works with many different kinds of links, TCP performance, in particular, the throughput possible across the TCP connection, depends largely on the characteristics of the particular link. Such flexibility is achieved at the cost of sub-optimal operation in a number of environments vis-à-vis a tailored protocol. The tailored protocol, which is usually proprietary in nature, may be more optimal, but greatly lacks flexibility in terms of networking environments and interoperability. Also, development costs of such protocols are high. An alternative to a tailored protocol is the use of a general class of network performance enhancing functions termed "TCP spoofing," to improve TCP performance over impaired (i.e., high latency or high error rate) links.

TCP spoofing, conventionally, cannot be effectively implemented in an asymmetric bandwidth network. Asymmetric links are typically deployed for access to the Internet, as a large number of end user applications, such as web browsing, require a relatively low return channel (i.e., upstream) compared to the forward channel (i.e., downstream). Under this conventional approach, data that is otherwise available cannot be sent to the receiver because ACKs (acknowledgements) are delayed/queued on the return channel.

Another conventional technique for improving network performance is to employ an ACK reduction (filtering) mechanism by preventing overloading of low bandwidth communication channels. However, this mechanism is not only ineffective, but worsens network performance. In this conventional arrangement, the host network layer (device drivers) selectively drops TCP acknowledgements that are received from the transport layer (TCP/IP stack), potentially triggering unnecessary retransmissions.

Based on the foregoing, there is a clear need for improved approaches to optimizing network performance. There is also a need to enhance network performance, without a costly infrastructure investment. There is also a need to employ a network performance enhancing mechanism that complies with existing standards and techniques to facilitate rapid deployment. Therefore, an approach for optimizing network performance using a proxy architecture is highly desirable.

SUMMARY OF THE INVENTION

These and other needs are addressed by the present invention in which a gateway is employed to force a maximum window value at a receiving host, irrespective of the window value of a sending host. The window value is computed based upon an adaptive bandwidth algorithm, which seeks to maintain the maximum window value in a dynamic networking environment; the window value is reduced only under a buffer starved state. According to one embodiment, the present invention can be implemented with other performance enhancing mechanisms, such as ACK reduction and TCP spoofing. The present invention provides enhanced network performance, particularly in the scenario whereby the gateway connects to the receiving host over an asymmetric bandwidth network.

In an aspect of the present invention, a method for providing proxying services is disclosed. The method includes buffering a packet received from a first host in a queue. The method also includes determining a window value for maximizing transmission rate based upon occupancy of the queue. The method further includes transmitting the packet to a second host according to a prescribed protocol to force use of the determined window value in the second host.

In another aspect of the present invention, a method for exchanging packets with a host via a gateway is disclosed. The method includes receiving a packet from the gateway. The packet specifies a window value, wherein the gateway includes a queue for buffering packets from the host. The window value is set for maximal transmission rate based upon occupancy of the queue. The method also includes communicating with the host based upon the received window value.

In another aspect of the present invention, a network device for providing proxying services is disclosed. The device includes a queue for buffering a packet received from a first host. The device also includes a processor that is configured to determine a window value for maximizing transmission rate based upon occupancy of the queue. The device also includes a communication interface that is coupled to the processor and is configured to transmit the packet to a second host according to a prescribed protocol to force use of the determined window value in the second host.

In yet another aspect of the present invention, a communications system includes a pluraility of communications channels for transporting packets. The system also includes a gateway that is coupled to the communications channels. The gateway is configured to buffer a packet received over one of the communications channel from a first host in a queue and to determine a window value for maximizing transmission rate based upon occupancy of the queue. The gateway is configured to transmit the packet that contains the determined window value to a second host according to a prescribed protocol to force use of the determined window value in the second host over another one of the communications channels.

In still another aspect of the present invention, a network device for providing proxying services is disclosed. The device includes means for buffering a packet received from a first host. The device also includes means for determining a window value for maximizing transmission rate based upon occupancy of the buffering means. The device further includes means for transmitting the packet to a second host according to a prescribed protocol to force use of the determined window value in the second host.

In still another aspect of the present invention, a computer-readable medium carrying one or more sequences of one or more instructions for providing proxying services is disclosed. The one or more sequences of one or more instructions include instructions which, when executed by one or more processors, cause the one or more processors to perform the step of buffering a packet received from a first host in a queue. Another step includes determining a window value for maximizing transmission rate based upon occupancy of the queue. A further step includes transmitting the packet to a second host according to a prescribed protocol to force use of the determined window value in the second host.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the present invention is discussed with respect to the Internet and the Transmission Control Protocol/Internet Protocol (TCP/IP) protocol suite, the present invention has applicability to other data networks and equivalent protocols.

Figure 1:
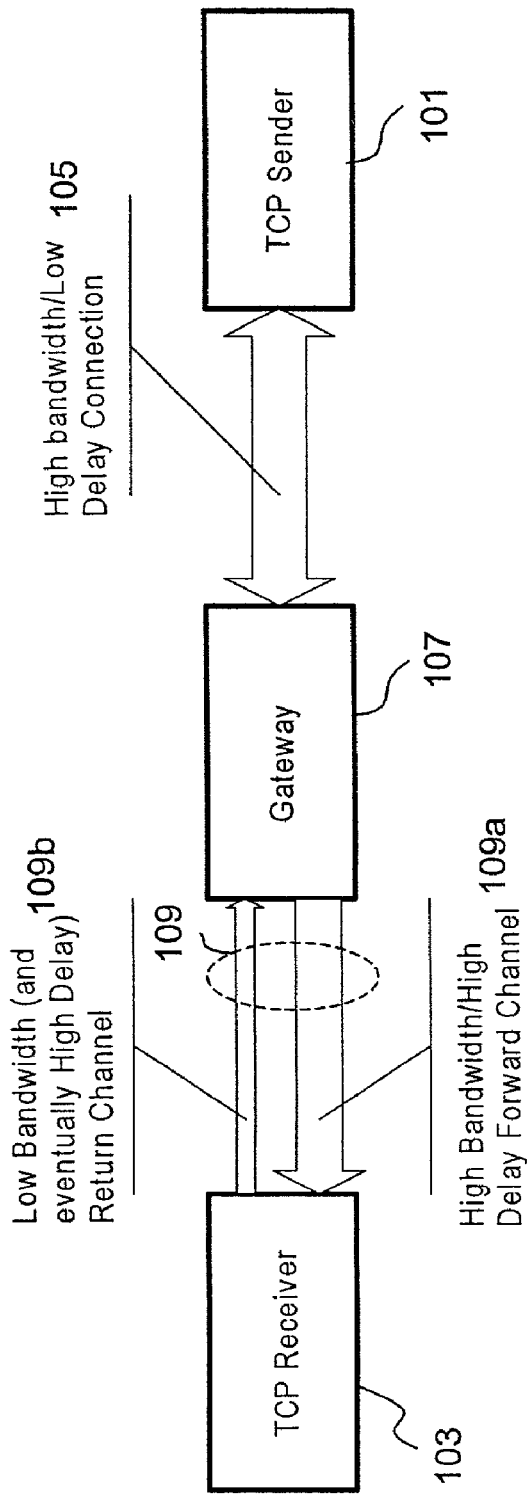
FIG. 1 is a diagram of a communications system utilizing a gateway to enhance network performance, according to an embodiment of the present invention.

FIG. 1 shows a diagram of a communications system utilizing a gateway to enhance network performance, according to an embodiment of the present invention. As shown, the communications system 100 includes a host or node (i.e., TCP sender 101) that is configured to send packets using, in an exemplary embodiment, TCP. The packets are destined to a TCP receiver 103, which is also a host or node that is capable of executing TCP. According to one embodiment of the present invention, the hosts 101, 103 can be configured to be both a sender and a receiver; however, for the purposes of explanation, the hosts 101, 103 are respectively referred to a sender and a receiver.

In this example, the TCP sender 101 communicates over a high bandwidth connection 105 with a gateway 107. The gateway 107 in turn forwards the packets that are received from the TCP sender 101 to the TCP receiver 103 over an asymmetric bandwidth network 109, which provides a high bandwidth forward channel 109a and a relatively lower bandwidth return channel 109b. In an exemplary embodiment, the high bandwidth connection 109a may be a DS-3 (Digital (Transmission) System) level connection. The TCP receiver 103 acknowledges and requests data through the lower bandwidth return channel 109b. The connection 109b may be characterized as a high delay—low bandwidth link, which may be a 10 Mbps sattelite link, for example.

Figure 4:
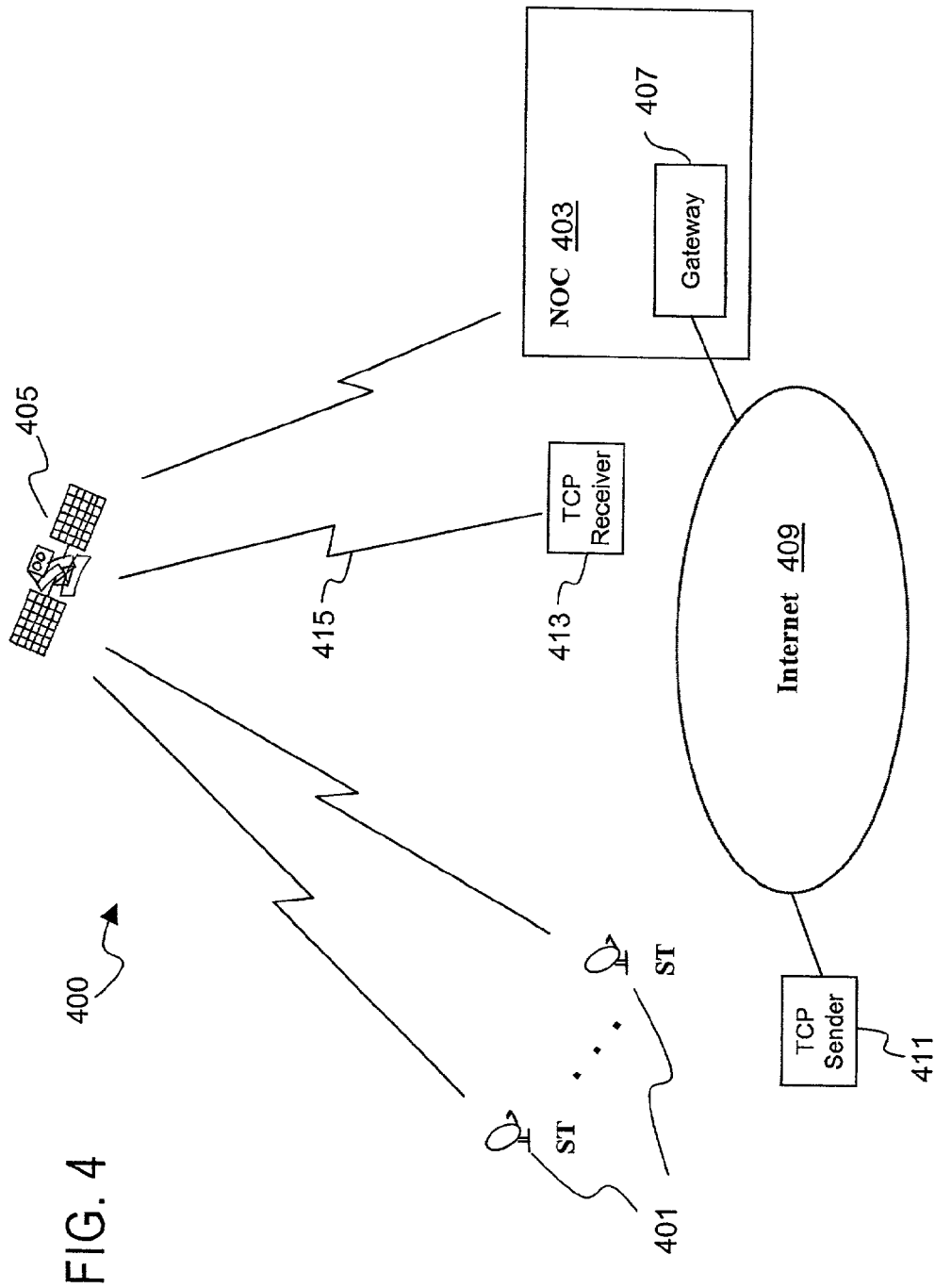
FIG. 4 is a diagram of satellite communications system employing a gateway to improve network performance, according to an embodiment of the present invention.

Accordingly, the return channel 109b may be either a dial-up or a satellite link (as shown in FIG. 4). The bandwidth asymmetry of the network 109 stems from the difference in bandwidth available on the respective forward and return channels 109a, 109b.

The architecture of the system 100, in this exemplary embodiment, is particularly suited for a residential or small business consumer, whose communications needs are asymmetric with respect to capacity. Such a consumer is more impacted by downstream capacity than upstream, as this type of consumer typically would not transfer large amounts of data. For example, a popular application for such a consumer is the World Wide Web (WWW), to which the architecture of the system 100 is most apt in that the downstream data from a server (e.g., TCP sender 101) is significantly greater than that of the request messages that are sent to the server.

The system 100 logically splits the connection between the TCP receiver 103 and TCP sender 101 in two parts: TCP receiver-to-gateway and gateway-to-TCP sender. Each one of these connections has its own windowing mechanism. These windowing mechanisms cooperate to achieve a smooth and fast data transfer from the TCP sender 101 to TCP receiver 103.

Traditionally, bandwidth asymmetry negatively impacts TCP performance. One reason is that the ACK (acknowledgement) clocking mechanism is disrupted by a low bandwidth (long delay) return channel. Also, under the conventional approach, data that is otherwise available at the gateway cannot be sent to the receiver because ACKs are delayed/queued on the return channel. Further, performance deteriorates even more if TCP receiver implements an ACK reduction (filtering) mechanism, which is used to prevent overloading of low bandwidth communication channels. In such a situation, the host network layer (device drivers) selectively drops TCP acknowledgements received from the transport layer (TCP/IP stack).

When the flow of ACKs on the return channel is drastically reduced, TCP performance can decrease significantly. Large gaps between ACKs can lead to unnecessary packet retransmissions. These retransmissions are harmful to the entire system as they are sent on the forward channel, occupying bandwidth that could have been otherwise used for different purposes. Retransmissions can also be regarded as bursts of data overlapping with the normal, smooth data transfer. Data bursts may not be handled well by the networking equipment, resulting in packet loss.

In the system 100, the TCP receiver 103, according to an exemplary embodiment, implements a form of ACK reduction, in which the following assumptions are satisfied: data and special ACK packets (with flags) and data/ACK packets are not dropped, and a minimum transmission rate for the ACKs is guarantee (e.g., one ACK every 100 msec). The system 100, as more fully described below, minimizes the combined negative effects of bandwidth asymmetry and ACK reduction to provide a high performance TCP connections between the TCP sender 101 and TCP receiver 103.

Modem TCP implementations have support for TCP options that help TCP implementations deal with network configurations displaying high bandwidth*delay products. These options are detailed in IETF (Internet Engineering Task Force) RFC (Request For Comment) 1323, entitled "TCP Extensions for High Performance," which is incorporated herein by reference in its entirety. Under the conventional approach, the use of these TCP options is not mandatory, thus leaving the use to be at the discretion of the protocol developers (implementers), system administrators, or end users. By contrast, the system 100 employs TCP window scaling (also known as "large windows" ) to allow a TCP receiver 103 to always run in window scale mode irrespective of the behavior of the TCP sender 101.

Figure 2:
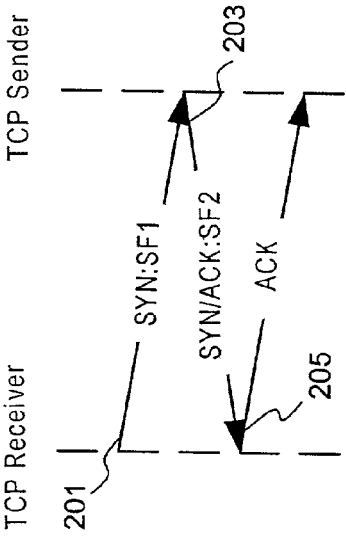
FIG. 2 is a diagram of a connection establishment between two hosts, according to an embodiment of the present invention.

FIG. 2 shows a diagram of a connection establishment between two hosts. Window scale options are exchanged at connection establishment time. A TCP receiver, as in step 201, advertises its window scaling factor (i.e., shifting factor SF1) through a SYN (synchronize) message. As used herein, the terms "scaling factor" and "shifting factor" are synonymous. If the TCP sender is compatible with the TCP receiver and appropriately configured, then the TCP sender replies with its own window shifting factor, SF2, via a SYN/ACK, per step 203. In step 205, the TCP receiver sends an ACK to the TCP sender to acknowledge the received scaling factor, SF2. However, if the TCP receiver does not implement large windows, then the TCP receiver does not advertise the scaling factor. In such as case, the advertised window, in an exemplary embodiment, is the 16 bit value (maximum 65,535 bytes) in the TCP header. In this scenario, the performance of the TCP connection depends on whether the TCP sender supports the use of large windows. To circumvent this dependency, the present invention introduces a gateway to force the TCP receiver to use the maximum window size, as discussed with respect to FIG. 3.

Figure 3:
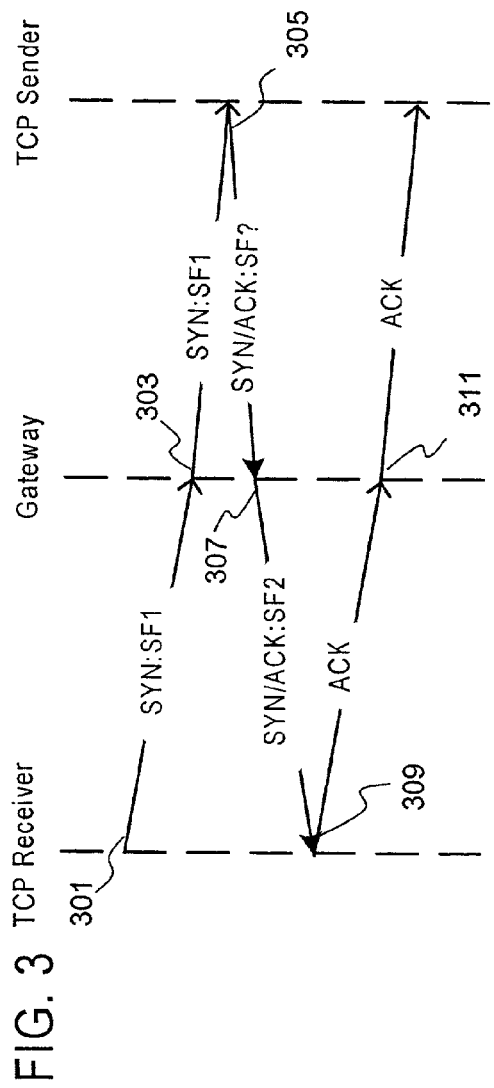
FIG. 3 is a diagram of a connection establishment through a gateway, according to an embodiment of the present invention.

FIG. 3 shows a diagram of a connection establishment through a gateway, according to an embodiment of the present invention. Unlike the flow of FIG. 2, the TCP connection passes through the gateway 107, as shown in FIG. 1. In this example, the TCP receiver 103 is configured to use large windows. Therefore in its first SYN, the TCP receiver 103 advertises its shift factor (SF1), per step 301. The gateway 107, as in step 303, forwards the SYN to the TCP sender 101, keeping the large windows option intact. It is noted that there is no guarantee that the TCP sender 101 is configured to, or even supports large windows; however, the present invention advantageously provides enhanced TCP performance without regard to whether the scaling option is supported by the TCP sender 101. In step 305, the TCP sender 101 transmits a SYN/ACK packet with its shift factor, if the TCP sender supports the large windows option. Diagrammatically, this uncertainty is shown as a question mark near the scale factor for the TCP sender 101. The gateway 107 examines the SYN/ACK message and, if large TCP window scale option is not present, the gateway 107 generates a scale factor and attaches the scale factor to the packet before sending the packet to the TCP receiver 103 (step 307). If the large TCP window scale option is set, the gateway 107 would forward the specified scale factor in step 307. In step 309, the TCP receiver 103 sends an ACK in response to the SYN/ACK message from the gateway 107 to the gateway 107, which in turn forwards the ACK to the TCP sender 101.

It is observed that the TCP receiver 103 operates with large windows, irrespective of the sender's capabilities; this independence advantageously permits the gateway 107 to provide enhanced performance over the asymmetric network 109 without controlling the characteristics of the TCP sender 101 (which is difficult and impractical to implement). The throughput is as follows:

Throughput=Window Size/Round Trip Time    Eq. (1)

If the return channel is a satellite link (as shown in FIG. 4), a typical value for the Round Trip Time (RTT) is 560 msec. Using a maximum 16 bit value for the window, the maximum achievable throughput in absence of large windows is:

Throughput=65535/560=117,027bytes/second    Eq. (2)

With large windows support, TCP windows may, for example, utilize 32 bit values; thus, the throughput correspondingly increases. The system 100 forces the use of large windows on the segment of TCP connection between the TCP receiver 103 and the gateway 107. As a result, increased utilization of the forward channel 109a is achieved, leading to higher performance.

Standard TCP implements slow start and congestion avoidance as measures for congestion control. Slow start leads to under-utilization of high bandwidth links. The system 100 may employ known TCP ACK spoofing to force the TCP sender 101 to exit its slow start phase and open up its congestion window faster. As such, the gateway 107 uses the spoofing mechanism to ACK each and every packet received from the TCP sender 101, so that the TCP sender 101 may open up its congestion window, and therefore, may send more data per window.

The gateway 107 forces the receive window close to the highest; e.g., 16 bit value—65535 bytes. This capability is important because the TCP sender 101 only sends the minimum amount of data between its congestion window and the peer's receive window.

According to an embodiment of the present invention, the gateway 107 has a retransmission queue for each TCP connection that the gateway 107 manages. Data that is received from the TCP sender 101 is sent to the TCP receiver 103 over the forward channel 109a and buffered in the gateway 107 until the TCP receiver 103 acknowledges the received data.

Conventional TCP implementations have a fixed maximum value for the receive buffer space; this is also the maximum window that this TCP host will advertise. The buffer space is likey to remain constant for the lifetime of the connection. The reason is that applications can use socket APIs to set the size of the receive buffer. Receive windows are calculated based on how much space is left in the buffer. Data that sits in the buffer is data that has not yet been acknowledged. Under the conventional approach, a gateway would closes its receive windows (advertised to the TCP sender), while waiting for ACKs from the TCP receiver. These ACKs travel over the low bandwidth/high delay link. The TCP sender also implements a form of ACK reduction. In these conditions, the amount of unacknowledged data can increase, as shown below in Eq. (3).

$$\text{Receive Window} = \text{Buffer Space [bytes]} - \text{Unacknowledged bytes} \quad \text{Eq. (3)}$$

By contrast, the gateway 107 in the system 100 avoids any variation in the receive window. That is, the gateway 107 forces the maximum window to the sender 101 independent of the acknowledgement process. The retransmission buffer is allowed to grow until the system 100 cannot offer more buffering; this is the moment when the gateway 107 starts to lower the window to the sender 101, but not earlier than this moment. For example, when a new connection is established, the receive window is initialized to the maximum window value (e.g., 65,535 bytes). However, if the system 100 is under heavy load, in which all the buffering resources are depleted to existing connections, the receive window is kept at this value as long as the required storage can be provided.

When the amount of data accumulated in the retransmission queue exceeds the maximum supported by the system 100, the receive window is decreased. The receive window is calculated using the following algorithm:

```
Bytes Available Per Connection = Total
        Memory / Current TCP Connections
if( Bytes In Queue >= Bytes Available Per
        Connection)
{
    Receive Window Size -= Maximum Segment
        Size
    if( Receive Window Size < Maximum
        Segment Size)
    {
        Receive window Size = Maximum Segment
        Size
    }
}
else
{
    if( Receive Window Size < 65535)
    {
        Receive Window Size += Maximum
        Segment Size
        if( Receive Window Size > 65535)
        {
            Receive Window Size = 65535
        }
    }
}
```

When buffering resources are scarce, the receive window size is reduced with the maximum segment size (MSS). The MSS is calculated exchanged in at connection establishment time. Since the gateway 107 sends an ACK to the TCP sender 101 for each data packet, it is likely that the receive window will decrease fast when needed. At that point, the sender's congestion window is probably very large and a large number of data packets are already in the pipe heading towards the gateway 107. Therefore an equal number of ACKs will go back to the TCP sender 101 indicating smaller and smaller receive windows. The TCP sender 101 will immediately start throttling its transmission.

Tables 1 and 2 provide experimental results of an embodiment of the present invention. The experiment of Table 1 assumes that the TCP sender 101 has large windows capability. Also, the TCP sender 101 has the domain name of "ftp.happypuppy.com", while the domain name of the TCP receiver 103 is "hh1100072.direcpc.com".

TABLE 1

| Message | Packet Content |
|---|---|
| SYN | IP Header - Internet Protocol Datagram |
|  | . . . |
|  | Source IP Address: |
|  |    206.71.100.72 |
|  |    hh1100072.direcpc.com |
|  | Dest. IP Address: |
|  |    199.105.102.130 |
|  |    ftp.happypuppy.com |
|  | No Internet Datagram Options |
|  | TCP - Transport Control Protocol |
|  |    Source Port:   1027 |
|  |    Destination Port:   21 FTP Control |
|  |    - File Transfer (control) |
|  |    Sequence Number:   295131 |
|  | . . . |
|  |    TCP Options: |
|  |       Option Type:   2 Maximum Segment Size |
|  |       Length:   4 |
|  |       MSS:   1420 |
|  |       Option Type:   1 No Operation |
|  |       Option Type:   3 Window Scale Factor |
|  |       Length:   3 |
|  |       Shift Count:   2 |
|  |       Option Type:   1 No Operation |
|  |       Option Type:   1 No Operation |
|  |       Option Type:   4 |
|  |       Length:   2 |
|  |       Opt Value: |
|  | No More FTP Command or Reply Data |
|  | Frame Check sequence: 0x00000000 |
| SYN/ACK | Ethernet Header |
|  | IP Header - Internet Protocol Datagram |
|  | . . . |
|  | Source IP Address: |
|  |    199.105.102.130 |
|  |    ftp.happypuppy.com |
|  | Dest. IP Address: |
|  |    206.71.100.72 |
|  |    hh1100072.direcpc.com |
|  | No Internet Datagram Options |
|  | TCP - Transport Control Protocol |
|  |    TCP Options: |
|  |       Option Type:   1 No Operation |
|  |       Option Type:   3 Window scale Factor |
|  |       Length:   3 |
|  |       Shift Count:   0 |
|  |       Option Type:   2 Maximum Segment Size |
|  |       Length:   4 |
|  |       MSS:   1420 |
|  | No More FTP Command or Reply Data |
|  | Frame Check Sequence: 0x00000000 |
| ACK | IP Header - Internet Protocol Datagram |
|  | Source IP Address: 206.71.100.72 |
|  |    hh1100072.direcpc.com |
|  | Dest. IP Address: |
|  |    199.105.102.130 |
|  |    ftp.happypuppy.com |
|  | No Internet Datagram Options |
|  | TCP - Transport Control Protocol |
|  | . . . |
|  |    No TCP Options |
|  | No More FTP Command or Reply Data |
|  | Frame Check Sequence: 0x00000000 |

In the above scenario, as shown in Table 1, the TCP sender 101 advertises a scaling factor of 2. The TCP receiver 103 shows a scaling factor of 0. All receive windows advertised by the gateway 107 will be shifted to the right with 2 positions before being applied to the corresponding field in the TCP header (in each ACK). The TCP sender 101 shifts the TCP header value to the left with 2 positions to get the value of the receive window. The TCP receiver 103 directly uses the TCP header value, since the sender's shifting factor is 0.

The results of Table 2 involve the scenario in which the TCP sender 101 does not have large windows capability: The TCP sender is "ftp.novell.com". The TCP receiver 103 is "hh1100072.direcpc.com".

TABLE 2

| Message | Packet Content | |
|---|---|---|
| SYN | IP Header - Internet Protocol Datagram | |
| | Source IP Address: 206.71.100.72 hh1100072.direcpc.com | |
| | Dest. IP Address: 192.233.80.108 ftp.novell.com | |
| | No Internet Datagram Options | |
| | TCP - Transport Control Protocol | |
| | ... | |
| | TCP Options: | |
| | Option Type: | 2 Maximum Segment Size |
| | Length: | 4 |
| | MSS: | 1420 |
| | Option Type: | 1 No Operation |
| | Option Type: | 3 Window Scale Factor |
| | Length: | 3 |
| | Shift Count: | 2 |
| | Option Type: | 1 No Operation |
| | Option Type: | 1 No Operation |
| | Option Type: | 4 |
| | Length: | 2 |
| | Opt Value: | |
| | No More FTP Command or Reply Data | |
| | Frame Check Sequence: 0x00000000 | |
| SYN/ACK | IP Header - Internet Protocol Datagram | |
| | ... | |
| | Source IP Address: 192.233.80.108 ftp.novell.com | |
| | Dest. IP Address: 206.71.100.72 hh1100072.direcpc.com | |
| | No Internet Datagram Options | |
| | TCP - Transport Control Protocol | |
| | ... | |
| | TCP Options: | |
| | Option Type: | 2 Maximum Segment Size |
| | Length: | 4 |
| | MSS: | 1420 |
| | No More FTP Command or Reply Data | |
| | Extra bytes (Padding): | |
| | .. | 00 00 |
| | Frame Check Sequence: 0x00000000 | |
| ACK | IP Header - Internet Protocol Datagram | |
| | ... | |
| | Source IP Address: 206.71.100.72 hh1100072.direcpc.com | |
| | Dest. IP Address: 192.233.80.108 ftp.novell.com | |
| | No Internet Datagram Options | |
| | TCP - Transport Control Protocol | |
| | ... | |

TABLE 2-continued

| Message | Packet Content |
|---|---|
| | No TCP Options |
| | No More FTP Command or Reply Data |
| | Frame Check sequence: 0x00000000 |

The TCP sender's SYN/ACK does not contain the window scale option, as it is not supported in this host 101. The gateway 107 tests for large windows option in the SYN/ACK. If the gateway 107 is configured with large windows support, then the gateway 107 adds this option by enhancing the SYN/ACK received from the TCP sender 101.

The throughput achieved at the TCP receiver 103 is independent on whether the TCP sender 101 implements large windows or not. As discussed previously, this is due to the enforcement of large windows between the gateway 107 and the TCP sender 101. The throughput is, however, dependent on whether the gateway 107 is configured with large windows or not.

Table 3, below, presents throughput results achieved under the following scenario. The maximum read/write buffers is set to 4096 Bytes; this value is based upon a standard FTP (File Transfer Protocol) client. A single file with the length of 81,536,858 bytes was downloaded from a popular web site. A simulated satellite link with round trip delay averages around 250 ms was utilized.

TABLE 3

| Gateway Configured with Large Windows | Gateway Not Configured with Large Windows |
|---|---|
| Throughput 4.3 Mbits/sec | Throughput 540 kBits/sec |

FIG. 4 is a diagram of satellite communications system employing a gateway to improve network performance, according to an embodiment of the present invention. The satellite communications system 400 includes satellite terminals (STs) 401 that are configured to communicate among with a Network Operations Center (NOC) 403 via a satellite 405, which possesses a gateway 407 for providing the window scaling functionality as described above in FIGS. 1 and 3. The gateway 407 communicates with the Internet 409. In an exemplary embodiment, the satellite communications system 400 is a two-way satellite system that supports bi-directional communication channels for the STs 401 over the satellite 405.

A TCP sender 411, such as a web server for example, is connected to the Internet 409. In this system 400, a TCP receiver 413 may receive information from the TCP sender 411. In an exemplary embodiment, a satellite link 415 from the TCP receiver 413 to the satellite 405 is asymmetric, whereby the uplink bandwidth of the link 415 is lower than the downlink bandwidth. Under the above arrangement, the system 400 provides decreased response times for the user of the TCP receiver 413.

In comparison to the system 100 of FIG. 1, the satellite link 415 constitutes an asymmetric connection, and the Internet 409 represents a relatively high bandwidth network. Although FIG. 3 shows the Internet 409 as providing connectivity from the TCP sender 411 to the gateway 407, it is recognized that any number of data networks may be utilized; e.g., an ATM (Asynchronous Transfer Mode) network, a frame relay network, an optical network, and etc.

Figure 5:
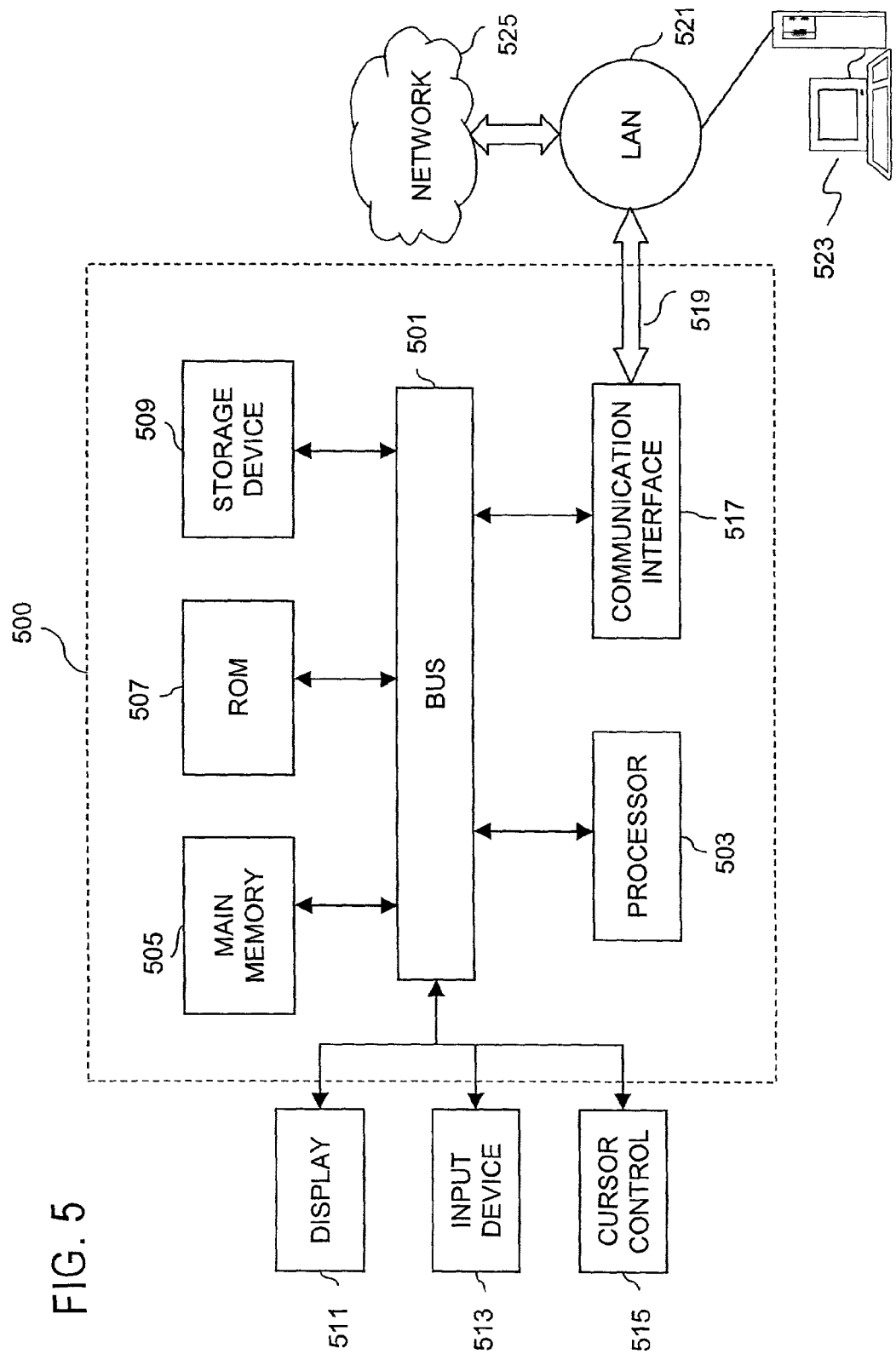
FIG. 5 is a diagram of a computer system that can be used to implement an embodiment of the present invention.

FIG. 5 illustrates a computer system 500 upon which an embodiment according to the present invention can be implemented. The computer system 500 includes a bus 501 or other communication mechanism for communicating information, and a processor 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions to be executed by the processor 503. The computer system 500 further includes a read only memory (ROM) 507 or other static storage device coupled to the bus 501 for storing static information and instructions for the processor 503. A storage device 509, such as a magnetic disk or optical disk, is additionally coupled to the bus 501 for storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is cursor control 515, such as a mouse, a trackball, or cursor direction keys for communicating direction information and command selections to the processor 503 and for controlling cursor movement on the display 511.

According to one embodiment of the invention, the gateway functionalities is provided by the computer system 500 in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the present invention. Thus, embodiments of the present invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, or a telephone modem to provide a data communication connection to a corresponding type of telephone line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although only a single communication interface 517 is shown, it is recognized that multiple communication interfaces may be employed to communicate with different networks and devices.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by service provider. The local network 521 and network 525 both use electrical, electromagnetic, or optical signals to convey information and instructions. The signals through the various networks and the signals on network link 519 and through communication interface 517, which communicate digital data with computer system 500, are exemplary forms of carrier waves bearing the information and instructions.

The computer system 500 can send messages and receive data, including program code, through the network(s), network link 519, and communication interface 517. In the Internet example, a server (not shown) might transmit requested code belonging an application program for implementing an embodiment of the present invention through the network 525, local network 521 and communication interface 517. The processor 504 may execute the transmitted code while being received and/or store the code in storage device 59, or other non-volatile storage for later execution. In this manner, computer system 500 may obtain application code in the form of a carrier wave.

The term "computer-readable medium" as used herein refers to any medium that participates in providing instructions to the processor 504 for execution. Such a medium may take many forms, including but not limited to non-volatile media, volatile media, and transmission media. Non-volatile media include, for example, optical or magnetic disks, such as storage device 509. Volatile media include dynamic memory, such as main memory 505. Transmission media include coaxial cables, copper wire and fiber optics, including the wires that comprise bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Accordingly, the present invention provides a proxy architecture that includes a gateway for forcing a maximum window value at a receiving host, irrespective of the window value of a sending host. The window value is computed based upon an adaptive bandwidth algorithm, which seeks to maintain the maximum window value in a dynamic networking environment; the window value is reduced only under a buffer starved state. The present invention can be implemented with other performance enhancing mechanisms, which, in an exemplary embodiment, include ACK reduction and TCP spoofing. The proxy architecture of the present invention provides enhanced network performance, particularly in an asymmetric bandwidth network.

While the present invention has been described in connection with a number of embodiments and implementations, the present invention is not so limited but covers various obvious modifications and equivalent arrangements, which fall within the purview of the appended claims.

What is claimed is:

1. A method for providing proxying services, the method comprising:
   buffering a packet received from a first host in a queue;
   determining a window scale value for maximizing transmission rate based upon occupancy of the queue;
   adding the window scale value to the packet to create a modified packet if the packet received from the first host does not already include any window scale value; and
   transmitting the modified packet to a second host according to a prescribed protocol to force use of the determined window value in the second host.

2. The method according to claim 1, further comprising:
   reducing the window scale value when the occupancy of the queue exceeds a predetermined threshold.

3. The method according to claim 1, further comprising:
   transmitting an acknowledgement packet to the first host prior to receiving an associated acknowledgement from the second host.

4. The method according to claim 1, wherein the transmitting step is performed over an asymmetric bandwidth network that provides a forward channel and a return channel that has a relatively lower bandwidth than the forward channel, the method further comprising:
   receiving an acknowledgement packet from the second host over the return channel.

5. The method according to claim 4, wherein the asymmetric bandwidth network is a two-way satellite communications network.

6. The method according to claim 1, wherein the first host in the buffering step is configured to perform acknowledgement reduction to minimize transmission of acknowledgement packets.

7. The method according to claim 1, wherein the prescribed protocol in the transmitting step is Transmission Control Protocol.

8. A method for exchanging packets with a host via a gateway, the method comprising:
   receiving a packet from the gateway, the packet specifying a window scale value, wherein the gateway includes a queue for buffering packets from the host, the window scale value being set by the gateway in response to the gateway receiving the packet without the window scale value, the window scale value being set for maximal transmission rate based upon occupancy of the queue; and
   communicating with the host based upon the received window scale value.

9. The method according to claim 8, wherein the window scale value is reduced when the occupancy of the queue exceeds a predetermined threshold.

10. The method according to claim 8, wherein the gateway is configured to perform spoofing to acknowledge receipt of packets from the host.

11. The method according to claim 8, wherein the receiving step is performed over an asymmetric bandwidth network that provides a forward channel and a return channel that has a relatively lower bandwidth than the forward channel.

12. The method according to claim 11, wherein the asymmetric bandwidth network is a two-way satellite communications network.

13. The method according to claim 8, wherein the host is configured to perform acknowledgement reduction to minimize transmission of acknowledgement packets.

14. The method according to claim 8, wherein communicating with the host includes communicating according to Transmission Control Protocol.

15. A network device for providing proxying services, the device comprising:
   a queue for buffering a packet received from a first host;
   a processor configured to (i) determine a window scale value for maximizing transmission rate based upon occupancy of the queue, and to (ii) add the window scale value to the packet to create a modified packet if the packet received from the first host does not already include any window scale value; and
   a communication interface coupled to the processor and configured to transmit the modified packet to a second host according to a prescribed protocol to force use of the determined window value in the second host.

16. The device according to claim 15, wherein the window scale value is reduced when the occupancy of the queue exceeds a predetermined threshold.

17. The device according to claim 15, wherein the communication interface is configured to transmit an acknowledgement packet to the first host prior to receiving an associated acknowledgement from the second host.

18. The device according to claim 15, wherein the transmitting step is performed over an asymmetric bandwidth network that provides a forward channel and a return channel that has a relatively lower bandwidth than the forward channel, the communication interface receiving an acknowledgement packet from the second host over the return channel.

19. The device according to claim 18, wherein the asymmetric bandwidth network is a two-way satellite communications network.

20. The device according to claim 15, wherein the first host is configured to perform acknowledgement reduction to minimize transmission of acknowledgement packets.

21. The device according to claim 15, wherein the prescribed protocol is Transmission Control Protocol.

22. A communications system comprising:
   a plurality of communications channels for transporting packets; and
   a gateway coupled to the communications channels, the gateway being configured to (i) buffer a packet received over one of the communications channel from a first host in a queue, (ii) determine a window scale value for maximizing transmission rate based upon occupancy of the queue; and (iii) add the window scale value to the packet to create a modified packet if the packet received from the first host does not already include any window scale value, wherein the gateway is configured to transmit the modified packet to a second host according to a prescribed protocol to force use of the determined window scale value in the second host over another one of the communications channels.

23. The system according to claim 22, wherein the window scale value is reduced when the occupancy of the queue exceeds a predetermined threshold.

24. The system according to claim 22, wherein the gateway is configured to perform spoofing to acknowledge receipt of packets from the host.

25. The system according to claim 22, wherein the other one of the communications channel is an asymmetric channel that includes a forward channel and a return channel, the return channel has a relatively lower bandwidth than the forward channel.

26. The system according to claim 25, wherein the asymmetric channel is provided by a two-way satellite communications network.

27. The system according to claim 22, wherein the first host is configured to perform acknowledgement reduction to minimize transmission of acknowledgement packets.

28. The system according to claim 22, wherein the prescribed protocol is Transmission Control Protocol.

29. A network device for providing proxying services, the device comprising:

means for buffering a packet received from a first host;

means for (i) determining a window scale value for maximizing transmission rate based upon occupancy of the buffering means, and for (ii) adding the window scale value to the packet to create a modified packet if the packet received from the first host does not already include any window scale value; and means for transmitting the modified packet to a second host according to a prescribed protocol to force use of the determined window scale value in the second host.

30. The device according to claim 29, further comprising:

means for reducing the window scale value when the occupancy of the buffering means exceeds a predetermined threshold.

31. The device according to claim 29, further comprising:

means for transmitting an acknowledgement packet to the first host prior to receiving an associated acknowledgement from the second host.

32. The device according to claim 29, wherein the transmitting means is coupled to an asymmetric bandwidth network that provides a forward channel and a return channel that has a relatively lower bandwidth than the forward channel, the device further comprising:

means for receiving an acknowledgement packet from the second host over the return channel.

33. The device according to claim 32, wherein the asymmetric bandwidth network is a two-way satellite communications network.

34. The device according to claim 29, wherein the first host is configured to perform acknowledgement reduction to minimize transmission of acknowledgement packets.

35. The device according to claim 29, wherein the prescribed protocol is Transmission Control Protocol.

36. A computer-readable medium carrying one or more sequences of one or more instructions for providing proxying services, the one or more sequences of one or more instructions including instructions which, when executed by one or more processors, cause the one or more processors to perform the steps of:

buffering a packet received from a first host in a queue;

determining a window scale value for maximizing transmission rate based upon occupancy of the queue;

adding the window scale value to the packet to create a modified packet if the packet received from the first host does not already include any window scale value; and transmitting the modified packet to a second host according to a prescribed protocol to force use of the determined window scale value in the second host.

37. The computer-readable medium according to claim 36, wherein the one or more processors further perform the step of:

reducing the window scale value when the occupancy of the queue exceeds a predetermined threshold.

38. The computer-readable medium according to claim 36, wherein the one or more processors further perform the step of:

transmitting an acknowledgement packet to the first host prior to receiving an associated acknowledgement from the second host.

39. The computer-readable medium according to claim 36, wherein the transmitting step is performed over an asymmetric bandwidth network that provides a forward channel and a return channel that has a relatively lower bandwidth than the forward channel, the one or more processors further performing the step of:

receiving an acknowledgement packet from the second host over the return channel.

40. The computer-readable medium according to claim 39, wherein the asymmetric bandwidth network is a two-way satellite communications network.

41. The computer-readable medium according to claim 36, wherein the first host in the buffering step is configured to perform acknowledgement reduction to minimize transmission of acknowledgement packets.

42. The computer-readable medium according to claim 36, wherein the prescribed protocol in the transmitting step is Transmission Control Protocol.

* * * * *